(12) United States Patent
Flynn (10) Patent No.: US 8,273,436 B2
(45) Date of Patent: Sep. 25, 2012

(54) SEPARATABLE LABEL ASSEMBLY

(76) Inventor: Timothy J. Flynn, Key Largo, FL (US)

( * ) Notice: Subject to any disclaimer, the term of this patent is extended or adjusted under 35 U.S.C. 154(b) by 616 days.

(21) Appl. No.: 11/901,414

(22) Filed: Sep. 17, 2007

(65) Prior Publication Data

US 2009/0075010 A1 Mar. 19, 2009

(51) Int. Cl.
*B32B 9/00* (2006.01)
*B32B 33/00* (2006.01)
*G09F 3/10* (2006.01)

(52) U.S. Cl. ............ 428/42.2; 428/40.1; 428/41.8; 428/43; 428/136; 428/192; 40/638

(58) Field of Classification Search ............ 428/43
See application file for complete search history.

(56) References Cited

U.S. PATENT DOCUMENTS

| | | | |
|---|---|---|---|
| 2,276,297 A | 3/1942 | Flood | |
| 2,303,346 A | 12/1942 | Flood | |
| 2,331,019 A | 10/1943 | Flood | |
| 2,434,545 A * | 1/1948 | Brady, Jr. et al. | 206/447 |
| 2,679,928 A | 6/1954 | Bishop, Jr. et al. | |
| 2,765,205 A | 10/1956 | Capella et al. | |
| 2,883,044 A | 4/1959 | Kendrick | |
| 3,006,793 A | 10/1961 | Wheeler, III. | |
| 3,038,597 A | 6/1962 | Brady, Jr. | |
| 3,230,649 A | 1/1966 | Karn | |
| 3,480,198 A | 11/1969 | Repko | |
| 3,568,829 A | 3/1971 | Brady, Jr. | |
| 3,822,492 A | 7/1974 | Crawley | |
| 3,825,463 A * | 7/1974 | Amann | 428/41.1 |
| 3,859,157 A | 1/1975 | Morgan | |
| 3,896,246 A | 7/1975 | Brady, Jr. | |
| 3,914,483 A | 10/1975 | Stipek, Jr. | |
| 3,965,327 A | 6/1976 | Ehlscheid et al. | |
| 4,032,679 A | 6/1977 | Aoyagi | |
| 4,217,164 A | 8/1980 | La Mers | |
| 4,264,662 A | 4/1981 | Taylor et al. | |
| 4,356,375 A | 10/1982 | Josephy et al. | |

(Continued)

FOREIGN PATENT DOCUMENTS

DE 296 13 123 1/1997

(Continued)

OTHER PUBLICATIONS

Co-Pending Application U.S. Appl. No. 12/381,508, filed Mar. 12, 2009; inventors Timothy J. Flynn et al.; title Apparatus for Separating Label Assembly.

(Continued)

*Primary Examiner* — David Sample
*Assistant Examiner* — Jeff Vonch
(74) *Attorney, Agent, or Firm* — Pauley Petersen & Erickson (57) ABSTRACT

A label assembly including a face sheet, a back sheet, and a layer of an adhesive positioned between the face sheet and the back sheet. A separation line divides the label assembly into at least two portions. The separation line is formed by a first tearable line of separation extending across the back sheet and a second tearable line of separation extending across the face sheet. The first tearable line of separation is offset with respect to the second tearable line of separation, and at least one of the first and second tearable lines of separation includes an angled portion extending at an angle to an other of the at least one of the first and second tearable lines of separation.

23 Claims, 3 Drawing Sheets

U.S. PATENT DOCUMENTS

| | | | |
|---|---|---|---|
| 4,428,857 A | | 1/1984 | Taylor et al. |
| 4,537,809 A | | 8/1985 | Ang et al. |
| 4,648,930 A | | 3/1987 | La Mers |
| 4,704,317 A | * | 11/1987 | Hickenbotham et al. ..... 428/156 |
| 4,706,877 A | | 11/1987 | Jenkins |
| 4,771,891 A | | 9/1988 | Sorensen et al. |
| 4,865,204 A | | 9/1989 | Vance |
| 4,881,935 A | | 11/1989 | Slobodkin |
| 4,881,936 A | | 11/1989 | Slobodkin |
| 4,910,058 A | | 3/1990 | Jameson |
| 4,940,258 A | * | 7/1990 | Cuba et al. ..................... 283/81 |
| 4,947,567 A | * | 8/1990 | Hermann ....................... 40/630 |
| 5,011,559 A | | 4/1991 | Felix |
| 5,031,939 A | | 7/1991 | Webendorfer et al. |
| 5,091,035 A | | 2/1992 | Anhaüser |
| 5,182,152 A | * | 1/1993 | Ericson ....................... 428/40.9 |
| 5,318,325 A | | 6/1994 | Ipsen |
| 5,324,153 A | | 6/1994 | Chess |
| 5,328,538 A | | 7/1994 | Garrison |
| 5,484,168 A | | 1/1996 | Chigot |
| 5,487,915 A | | 1/1996 | Russ et al. |
| 5,520,990 A | | 5/1996 | Rotermund |
| 5,601,314 A | | 2/1997 | Burns et al. |
| 5,633,071 A | | 5/1997 | Murphy |
| 5,658,631 A | | 8/1997 | Bernstein et al. |
| 5,686,159 A | | 11/1997 | Langan |
| 5,700,535 A | | 12/1997 | Galsterer et al. |
| 5,756,175 A | | 5/1998 | Washburn |
| 5,788,284 A | | 8/1998 | Hirst |
| 5,947,525 A | | 9/1999 | Pollman |
| 5,981,013 A | | 11/1999 | Russ et al. |
| 5,997,683 A | | 12/1999 | Popat |
| 6,132,829 A | | 10/2000 | Kennerly et al. |
| 6,136,130 A | | 10/2000 | Tataryan et al. |
| 6,170,879 B1 | | 1/2001 | Rawlings |
| 6,284,708 B1 | | 9/2001 | Oshima et al. |
| 6,361,078 B1 | | 3/2002 | Chess |
| 6,364,364 B1 | | 4/2002 | Murphy |
| 6,385,860 B1 | | 5/2002 | MacWilliams et al. |
| 6,391,136 B1 | | 5/2002 | Stickelbrocks |
| 6,410,111 B1 | | 6/2002 | Roth et al. |
| 6,413,604 B1 | | 7/2002 | Matthews et al. |
| 6,427,905 B1 | * | 8/2002 | Flynn et al. ..................... 229/75 |
| 6,656,555 B1 | | 12/2003 | McKillip |
| 6,803,084 B1 | | 10/2004 | Do et al. |
| 6,837,957 B2 | | 1/2005 | Flynn et al. |
| 6,860,050 B2 | | 3/2005 | Flynn et al. |
| 7,246,823 B2 | | 7/2007 | Laurash et al. |
| 7,794,812 B2 | | 9/2010 | Sanford |
| 2002/0086127 A1 | | 7/2002 | Hodsdon et al. |
| 2002/0096874 A1 | | 7/2002 | Viby |
| 2003/0072976 A1 | | 4/2003 | Sanford |
| 2004/0033326 A1 | | 2/2004 | Tataryan et al. |
| 2004/0137198 A1 | | 7/2004 | Flynn et al. |
| 2004/0213943 A1 | | 10/2004 | Viby |
| 2005/0089663 A1 | * | 4/2005 | Wong et al. .................. 428/42.3 |
| 2005/0193608 A1 | | 9/2005 | Flynn et al. |
| 2005/0244603 A1 | * | 11/2005 | Hodsdon et al. ............. 428/40.1 |
| 2006/0110565 A1 | | 5/2006 | Tataryan et al. |
| 2006/0154012 A1 | | 7/2006 | Ashton et al. |
| 2008/0141568 A1 | | 6/2008 | Flynn |

FOREIGN PATENT DOCUMENTS

| | | | |
|---|---|---|---|
| EP | 0 765 514 | | 4/1997 |
| FR | 2 706 214 A | | 12/1994 |
| FR | 2 724 479 A | | 3/1996 |
| GB | 2177373 | | 1/1987 |
| JP | 56-145069 | | 11/1981 |
| JP | 60-11370 | | 1/1985 |
| JP | 64-43380 | | 3/1989 |
| JP | H5-11575 | | 3/1993 |
| JP | 06332382 A | * | 12/1994 |
| JP | 07-306641 | | 11/1995 |
| JP | 08-137403 | | 5/1996 |
| JP | 11-030954 | | 2/1999 |
| JP | 11-045051 | | 2/1999 |
| JP | 2001101827 | | 4/2001 |
| JP | 2002-82615 | | 3/2002 |
| WO | WO 92 19457 A | | 11/1992 |
| WO | WO 95 34879 A | | 12/1995 |
| WO | WO 97/01495 | | 1/1997 |
| WO | WO 99/31644 | | 6/1999 |
| WO | WO 00/32412 | | 6/2000 |
| WO | WO 01/84550 | | 11/2001 |
| WO | WO 01/89825 | | 11/2001 |
| WO | WO 02/26483 | | 4/2002 |
| WO | WO 2004/078468 | | 9/2004 |

OTHER PUBLICATIONS

Co-Pending Application U.S. Appl. No. 12/381,509, filed Mar. 12, 2009; inventors Timothy J. Flynn et al.; title Method for Separating Label Assembly.

Michael Fairley, Illustrated Encyclopedia of Labels and Label Technology, Tarsus Publishing Ltd., London, "First Published 2004", (6 pages: pp. iii, ii, 47, 54, 55 and 150).

* cited by examiner

SEPARATABLE LABEL ASSEMBLY

FIELD OF THE INVENTION

This invention relates generally to a label assembly and, more particularly, to a sheet of self-adhesive labels that are more easily removed from a backing and surrounding matrix.

BACKGROUND OF THE INVENTION

Self-adhesive labels on printable sheets for printing, such as through a computer printer, of individual address labels are well known. After printing, each label is removed from the sheet and applied to the desired substrate, such as an envelope for mailing. Removal of the labels by hand is generally performed by bending back the label sheet in a vicinity of a corner of the first label to be removed, which causes separation of the label and the liner. U.S. Patent Application Publication 2005/0089663 describes an attempt to make the removal of these labels easier or more efficient for the user. There remains a need for further improvements for label sheets to promote efficient label removal, particularly for relatively large mailings.

SUMMARY OF THE INVENTION

A general object of the invention is to provide an improved label assembly having a removable portion for exposing an end portion of the labels thereon.

A more specific objective of the invention is to overcome one or more of the problems described above.

The general object of the invention can be attained, at least in part, through a label assembly including a face sheet, a back sheet, and a layer of an adhesive positioned between the face sheet and the back sheet. A separation line divides the label assembly into at least two portions. The separation line is formed by a first tearable line of separation extending across the back sheet and a second tearable line of separation extending across the face sheet. The first tearable line of separation is offset with respect to the second tearable line of separation, and the separation line includes at an end an angled portion of one of the first and second tearable lines of separation extending at an angle to an other of the at least one of the first and second tearable lines of separation.

The invention further comprehends a label assembly including a back sheet and a face sheet releasably adhered to the back sheet. The face sheet includes a label column of a plurality of labels and a matrix bordering the label column. Each label of the plurality of labels abuts a portion of the matrix and is separated from the portion of the matrix by at least one die cut. A first tearable line of separation is formed in the back sheet and runs below the labels within the label column. A second tearable line of separation is formed in the matrix, and the first and second tearable lines of separation are offset from each other. At least one of the first and second tearable lines of separation is or includes an angled portion extending at an angle to an other of the first and second tearable lines of separation.

The invention still further comprehends a method for using a label assembly having a face sheet adhered to a back sheet and including a plurality of labels disposed in a label column. The method includes: routing the label assembly through a printer and printing on a first portion of the label assembly; separating the back sheet along a first tearable line of separation which extends at least partially below the label column; separating the face sheet along a second tearable line of separation that is offset with respect to the first tearable line of separation and that extends between a label assembly edge and the label column; tearing a first portion of at least one of the first and second tearable lines of separation at an angle away from an adjacent portion of an other of the first and second tearable lines of separation; tearing a second portion of the at least one of the first and second tearable lines of separation to expose an edge portion of each of the plurality of labels disposed in the label column; and removing at least one of the plurality of labels from the face sheet by pulling from the exposed edge portion.

Other objects and advantages will be apparent to those skilled in the art from the following detailed description taken in conjunction with the appended claims and drawings.

DETAILED DESCRIPTION OF THE EXEMPLARY EMBODIMENTS

Figure 1:
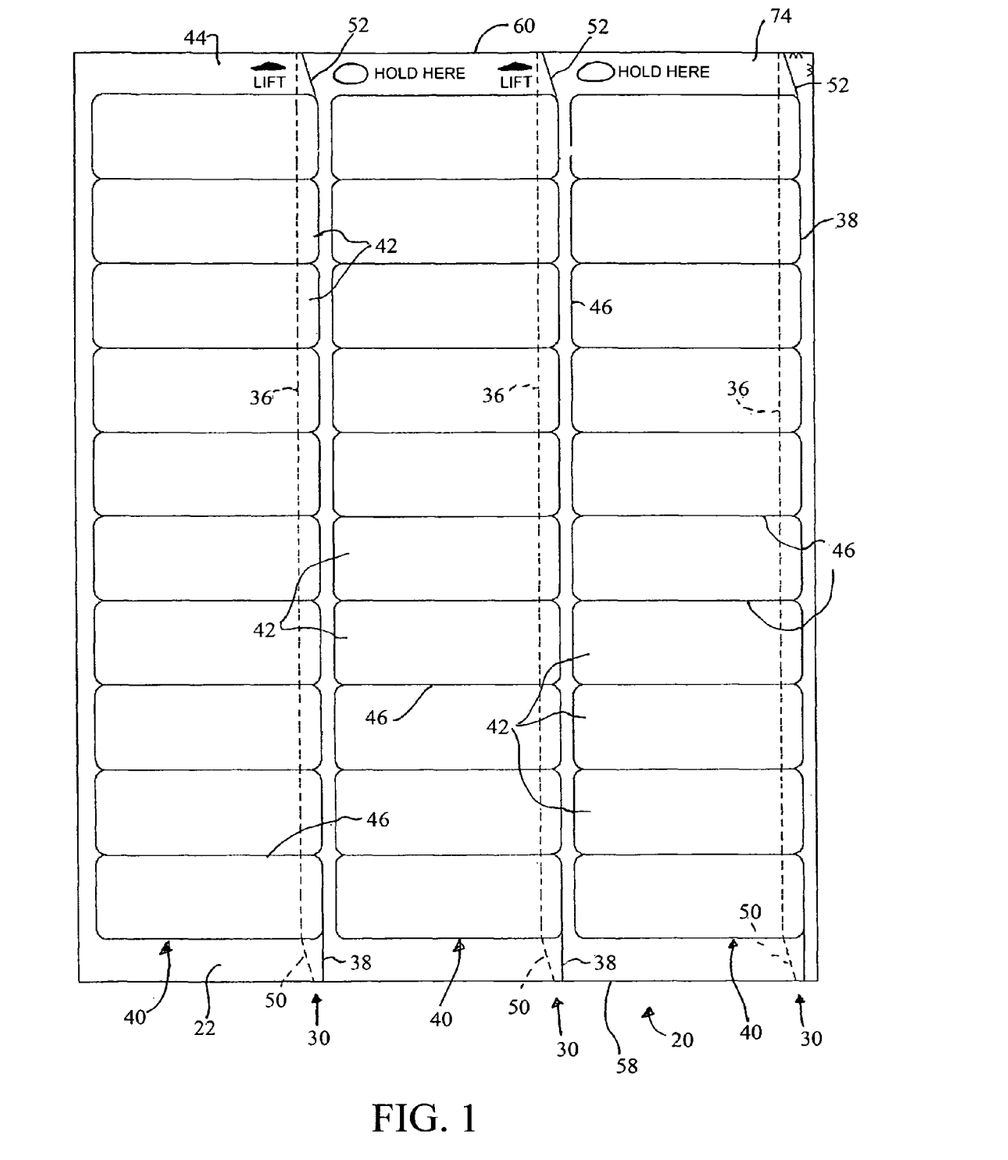
FIG. 1 is a plan view of a label assembly according to one embodiment of this invention.

FIG. 1 illustrates a label assembly 20 (not necessarily shown to scale), according to one embodiment of this invention. Label assembly 20 is desirably formed of a face sheet 22 and a back sheet (not shown in FIG. 1). The back sheet is desirably about the same size as the face sheet 22, but may be slightly larger or smaller than the face sheet 22. The surface of the face sheet 22 that is disposed toward the back sheet includes a layer of an adhesive material. The adhesive layer can include any adhesive material known and available to those skilled in the art for forming pressure sensitive, or self-adhesive labels. The back sheet is desirably formed of a material to which the adhesive coating adheres significantly less than to the face sheet 22, such as is known for forming pressure sensitive, or self-adhesive, labels. The adhesive coating covered by the back sheet is applied to the face sheet 22 in any suitable manner known to those skilled in the art.

The sheet assembly 20 is of any suitable shape, and generally any suitable size that can be accepted by and fed through a printer, such as a laser printer or an ink jet printer. Common sizes of paper generally fed through printers are 8.5 inches by 5.5 inches, 8.5 inches by 11 inches, 8.263 inches by 11.688 inches (A4 size), and 8.5 inches by 14 inches. The face sheet 22 is preferably, but not necessarily, constructed of any suitable paper, paper composite, non-metal and/or metal material that can be used as a label. Other suitable materials for constructing the sheet 22 include fabric, plastic, and metal foils.

The face sheet 22 desirably has a printable surface on a side opposite the adhesive coating. The phrase "printable surface" relates to a surface of any type of matter upon which a person or machine can draw, print, color, paint, photocopy, write, emboss, or make any other type of mark or graphic. Laser printers, ink jet printers, impact printers, thermal transfer printers, direct thermal printers, typewriters, or any other suitable graphic printing devices are preferred but not necessary for use with printable surfaces according to this invention.

The face sheet 22 and the printable surface can be any of a variety of face materials used to make pressure sensitive, or self-adhesive, labels. Such face materials may include, but are not limited to: smudgeproof stock, litho stock, cast coated stock, tag stock, fluorescent stock, foils, computer printable polyester, vinyl, satin cloth, Tyvek™ material, flexible plastic, book papers, photo quality papers and/or photo quality film. Furthermore, various portions of the face materials can be different colors, thereby resulting in different colored parts.

Figure 3:
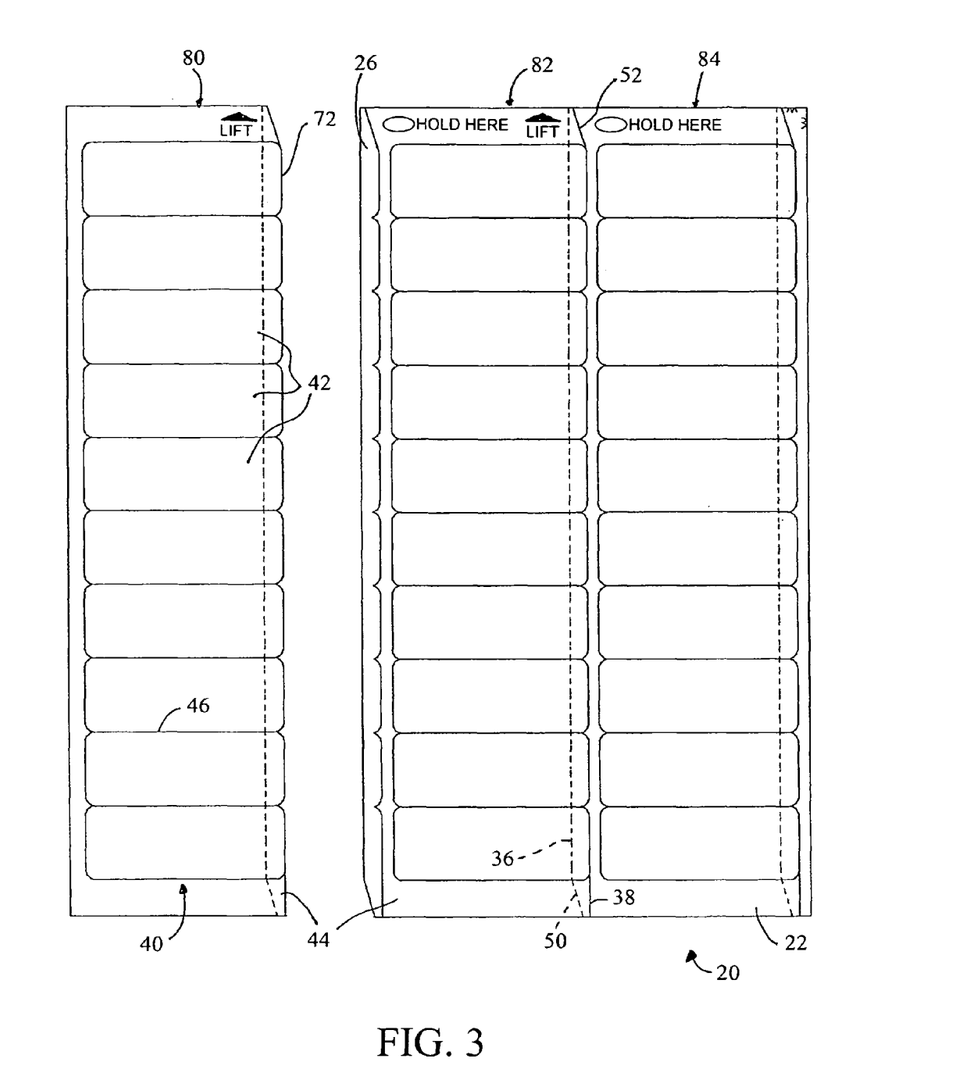
FIG. 3 is a plan view of the label assembly of FIG. 1 after separation of a first label column portion.

As shown in FIG. 1, label assembly 20 can be separated along separation lines 30 to divide label assembly 20 into portions 80, 82, and 84 shown in FIG. 3. As also shown in FIG. 1, three separation lines 30 are used to divide label assembly 20, but the label assembly 20 will be described below with reference to only one of the separation lines 30. It is apparent that any other suitable number of separation lines 30 can be used to divide label assembly 20 into any suitable number of equal or unequal portions. The separation line 30 is formed by a first tearable line of separation 36 extending across the back sheet and one or more second tearable line of separation 38 extending across the face sheet 22. The first and second tearable lines of separation 36 and 38 are offset from each other, such as by less than about 1 cm.

As used throughout this specification and in the claims, the phrase "tearable line," the phrase "line of separation," and/or the phrase "tearable line of separation" is intended to relate to a line of weakening of the structure of face sheet 22 and/or back sheet. The line of weakening has a weakened structural area along which face sheet 22 and/or back sheet can be separated. Each tearable line or line of weakening, according to this invention, comprises at least one of a die cut line, a kiss cut line (which is a die cut line that does not extend completely through a layer or sheet), a laser die cut line, a score cut line, a perforation line, a microperforation line, a chemically etched line, a liquid etched line and/or a gas etched line. Tearable line 36 and/or tearable line 38 of this invention may comprise any other suitable separation line or line of weakening known to those skilled in the art of label assemblies.

The face sheet 22 in FIG. 1 includes three label columns 40, each including a plurality of labels 42. The labels 42 are shown as rectangular labels, but can be of any of various shapes such as square or circular. Also, the configuration of the label columns 40 can vary depending on need and the shape of the labels. For example, the label columns can run vertically as shown or horizontally, and the number of labels per label column depends on the size and shape of the labels.

A matrix 44 borders each of the label columns 40. Each label 42 abuts a portion of the matrix 44 and is separated from the matrix 44 and an adjacent label 42 by a tearable line of separation 46. The first tearable line of separation 36 formed in the back sheet runs or extends below the labels 42 within the label column 40. In one embodiment, the second tearable line of separation 38 includes a portion that is disposed along, and forms in part, the labels 42, and extends in a direction generally parallel to a portion of the first tearable line of separation 36.

The first tearable line of separation 36 includes an angled portion 50 that extends at an angle to, and toward, the second tearable line of separation 38. The angled portion 50 desirably helps hold the sheet portions together during printing. At an opposite end of the separation line 30 from the angled portion 50, the second tearable line of separation 38 includes an angled portion 52 that extends at an angle to, and toward, the first tearable line of separation 36. The angled portions 50 and 52 extend in the matrix 44 or back sheet, respectively between the label column 40 and an edge 58 and 60, respectively, of the label assembly 20. As will be appreciated by those skilled in the art following the teachings herein provided, various and alternative configurations are available for the separation line 30 of this invention. For example, the two angled portions 50 and 52 could both in the face sheet or back sheet, or only one end of the separation line can include an angled portion. Also, various angles are available for the angled end portions of this invention.

In one particularly preferred embodiment of this invention, referring to FIG. 1, the first tearable line of separation 36 is formed of a perforated line of weakness having a plurality of cuts and ties and the second tearable line of separation 38 is formed by a die cut or a kiss cut through the face sheet 20. Desirably, the portion of the first tearable line of separation 36 along the label column 40 includes the cuts and ties, and the angled portion 50 is formed of only a cut, e.g., a die cut, with no tie within the angled portion 50. In one embodiment of this invention, the angled portions 50 and 52 stop short of the respective edge 58 and 60 of the label assembly, leaving a breakable material bridge (similar to a tie) at the edge 58 and 60 in order to provide additional strength and support during running through a printer. In one embodiment, at the edges 58 and 60 of the label assembly 20, the first tearable line of separation 36 is separated from the second tearable line of separation 38 by a distance of about 0.04 inch to about 0.08 inch.

Figure 2:
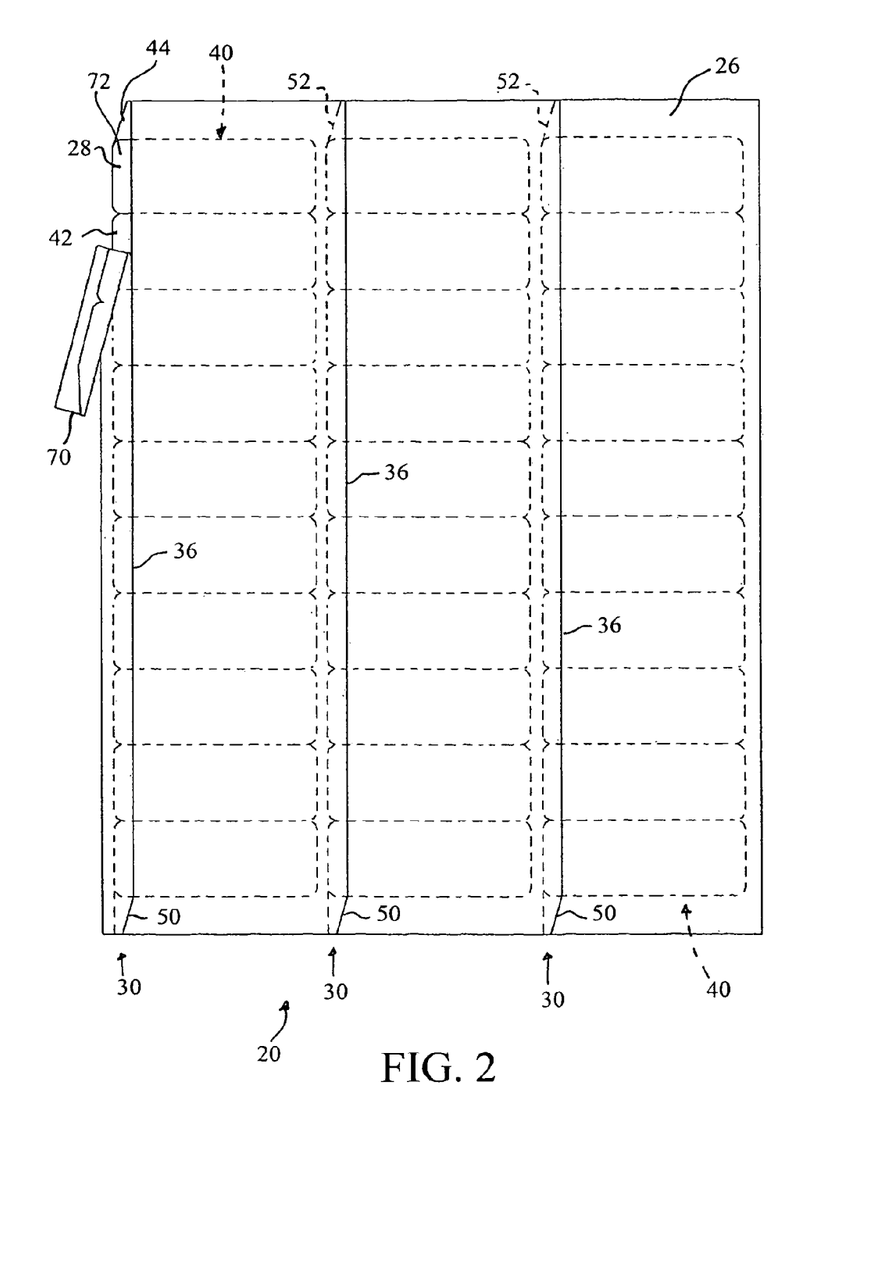
FIG. 2 is a plan view of an opposite side of the label assembly of FIG. 1.

The first line of separation 36 includes at least a portion running parallel to the longitudinal direction of the label column 40, and disposed about 0.4 to about 1.0 centimeters, and desirably about 0.6 centimeters, from one longitudinal edge of the label column 40. The exact distance is not critical, but desirably the first tearable line of separation 36 is offset from that edge of the label column 40 far enough so that when strip 70 is removed, labels 42, as shown in FIG. 2, can be easily grasped and removed by the user. At the same time, the first line of separation 36 is close enough to that edge of the label column 40 such that when the strip 70 is removed, a narrow enough edge portion 72 of the labels 42 with adhesive 28 is exposed so that when the label assembly 20 is placed onto a surface, the exposed edge of the unremoved labels 42 do not easily and inadvertently stick to the surface.

FIGS. 2 and 3 illustrate an operation of the separation lines 30 of the label assembly 20. FIG. 2 shows the label assembly 20 from the back, showing back sheet 26. In FIG. 2, the user has grasped one corner of label assembly 20 at approximately position 74 in FIG. 1 with one thumb and forefinger, and with the other thumb and forefinger grasped the narrow strip 70 of release liner and matrix so as to focus the shear forces along the separation line 30, and has began tearing strip 70 away from the rest of the assembly 20. Alternatively one portion of the label assembly 20 can be held against a surface while another portion is lifted away from the surface to separate the label assembly 20. As shown in FIGS. 1 and 3, the front sheet 22 can include printed arrows and instructions for where to place the fingers during tearing.

The strip 70 tears away as the back sheet 26 is separated along the first tearable line of separation 36 and the face sheet 22 separates along the second tearable line of separation 38. After the strip 70 is completely removed by the user, the previously adjacent label column 40 is left with labels 42 mostly attached to the back sheet 26 but having a relatively narrow edge portion 72 of the labels 42 with the underlying back sheet portion removed. The user can then easily peel off the individual labels 42 by hand one-by-one as desired without having to bend and manipulate the assembly 10 each time the user wishes to remove the next label.

FIG. 3 shows label assembly 20 having a full label column 40 removed therefrom. As discussed above, the label assembly 20 includes three vertical separation lines 30, with one separation line 30 associated with each label column 40. The separation lines 30 divide the label assembly 20 into three individual label portions 80, 82, and 84, which may be individually separated from each other. In FIG. 3, the left hand portion 80 has been separated from the still combined center portion 82 and right hand portion 84. The labels within left hand portion 80 are now ready to be easily peeled one by one from the back sheet and applied to envelopes or other substrates. Portions 82 and 84 do not have any portions of the labels 42 with their adhesive sides exposed. Thus, portions 82 and 84 can be handled and/or stored for later use without any degradation of the adhesive on the backs of those labels. Remaining portions 82 and 84 could even be fed through a printer for later printing. For example, if only ten or fewer labels are needed to be printed and used, the user could run label assembly 20 through a printer and print only on labels within the label column in portion 80. The user would then separate portion 80 and use the labels within that portion. Remaining combined portions 82 and 84 could be stored for later use. When additional labels are ready to be printed, the label assembly 20 could be fed through the printer.

Thus, the invention provides an improved label assembly structure for promoting easy removal of labels from the label assembly.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. A label assembly, comprising:
   a face sheet, a back sheet, and a layer of an adhesive positioned between said face sheet and the back sheet, the adhesive adhering to the face sheet more than to the back sheet, the face sheet defined by an outer peripheral edge surrounding the face sheet;
   a first label column of a first plurality of labels cut within the face sheet;
   a second label column of a second plurality of labels cut within the face sheet and spaced apart from the first label column, the second label column having a first side disposed toward the first label column and a second side disposed opposite the first side;
   a line of weakening dividing the label assembly into at least two portions, the line of weakening cut within the back sheet and below the first side of the second label column, the line of weakening including a parallel portion parallel to and offset from a side edge of the first side of the second label column, the line of weakening including an angled portion extending at a non-perpendicular angle from the parallel portion of the line of weakening, wherein the parallel portion comprises a plurality of cuts and ties and the angled portion comprises a cut tearable line and no ties.

2. The label assembly of claim 1, wherein the angled portion is angled from the parallel portion in a direction toward the first label column.

3. The label assembly of claim 1, wherein the angled portion comprises a die cut or a kiss cut.

4. The label assembly of claim 1, wherein the angled portion extends from an end of the second label column toward the outer peripheral edge of the label assembly.

5. The label assembly of claim 1, further comprising two angled portions angled from the parallel portion of the line of weakening.

6. The label assembly of claim 5, wherein each of the angled portions extends at the non-perpendicular angle from the parallel portion in a direction toward the first label column.

7. The label assembly of claim 1, wherein the first label column has a first label column first side disposed toward and spaced apart from one side of the peripheral edge of the face sheet and a first label column second side disposed opposite the first side and disposed toward the first side of the second label column, and further comprising:
   a second line of weakening dividing the label assembly into a third portion, the second line of weakening cut within the back sheet and below the first label column first side, the second line of weakening including a second line parallel portion parallel to and offset from a first label column side edge of the first label column first side, the second line of weakening including a second line angled portion extending at a second non-perpendicular angle from the second line parallel portion of the second line of weakening, wherein the second line parallel portion comprises a plurality of cuts and ties and the second line angled portion comprises a die cut and no ties.

8. The label assembly of claim 1, wherein the line of weakening is a first line of weakening and further comprising:
   a face sheet matrix between the outer peripheral edge of the face sheet and each of the first and second label columns;
   a second line of weakening cut in the face sheet, including at least a portion of the cut defining the second label column, and offset from the first line of weakening of the back sheet.

9. The label assembly of claim 8, wherein the second line of weakening extends through the face sheet matrix on each side of the second label column.

10. The label assembly of claim 8, wherein the second line of weakening does not intersect the first line of weakening.

11. The label assembly of claim 8, wherein the angled portion extends from an end of the second label column toward the outer peripheral edge of the label assembly.

12. The label assembly of claim 11, wherein at the outer peripheral edge the first line of weakening is separated from the second line of weakening by a distance of about 0.04 inch to about 0.08 inch.

13. The label assembly of claim 8, wherein the second line of weakening comprises a second angled portion extending at a non-perpendicular angle in a direction toward the first line of weakening.

14. The label assembly of claim 13, wherein the second angled portion of the second line of weakening is at an opposite end of the label assembly from the angled portion of the first line of weakening.

15. A label assembly, comprising:
   a back sheet;
   a face sheet releasably adhered to the back sheet, the face sheet including a label column of a plurality of labels, the face sheet further including a matrix bordering the label column, each label of the plurality of labels abutting a portion of the matrix and separated from the portion of the matrix by at least one die cut or kiss cut;
   a first tearable line of separation formed in the back sheet, the first tearable line of separation running below the labels within the label column;
   a second tearable line of separation formed in the face sheet, the second tearable line of separation defining a side of the label column;

the first and second tearable lines of separation offset from each other; and the first tearable line of separation comprising a parallel portion extending parallel to a portion of the second tearable line of separation, and at least one angled portion extending at a non-perpendicular angle from the parallel portion toward the second tearable line of separation, wherein the angled portion extends below the matrix and at the edge of the face sheet or the label assembly the first tearable line of separation is offset from the second tearable line of separation, wherein the parallel portion comprises a plurality of cuts and ties and the angled portion comprises a die cut tearable line.

16. The label assembly of claim 15, wherein the angled portion extends from an end of the label column toward an edge of the label assembly.

17. The label assembly of claim 16, wherein at the edge of the label assembly, the first tearable line of separation is separated from the second tearable line of separation by a distance of about 0.04 inch to about 0.08 inch.

18. The label assembly of claim 15, further comprising at least one second label column, each label column having associated therewith respectively a first tearable line of separation formed in the back sheet, a second tearable line of separation formed in the matrix and offset from the first tearable line of separation, and at least one of the first and second tearable lines of separation comprising an angled portion extending at an angle to an other of the at least one of the first and second tearable lines of separation.

19. The label assembly of claim 15, wherein each of the first and second tearable lines of separation comprises an angled portion extending at an angle to the other of the at least one of the first and second tearable lines of separation, and the angled portion of the first tearable line of separation is at an opposite end of the label assembly from the angled portion of the second tearable line of separation.

20. A label assembly, comprising:
a face sheet, a back sheet, a layer of an adhesive positioned between said face sheet and the back sheet, the adhesive adhering to the face sheet more than to the back sheet, the face sheet defined by an outer peripheral edge surrounding the face sheet;
a first label column of a first plurality of labels cut within the face sheet;
a second label column of a second plurality of labels cut within the face sheet and spaced apart from the first label column, the second label column having a first side disposed toward the first label column and a second side disposed opposite the first side;
a face sheet matrix separating each of the first label column and the second label column from the outer peripheral edge of the face sheet and extending between the first label column and the second label column, each label of the first and second plurality of labels abutting a portion of the matrix;
a separation line dividing the label assembly into at least two portions, the separation line formed by a first line of weakening extending across the back sheet and a second line of weakening extending across the face sheet, the first line of weakening cut within the back sheet below the first side of the second label column, and offset from the second line of weakening;
one of the first or second line of weakening including a first parallel portion extending parallel to a side edge of the outer periphery of the face sheet, the one of the first or second line of weakening including an angled portion extending at a non-perpendicular angle from the parallel portion of the one of the first or second line of weakening toward an other of the one of the first or second line of weakening, wherein the angled portion does not contact the other of the one of the first or second line of weakening.

21. The label assembly of claim 20, wherein the parallel portion comprises a plurality of cuts and ties and the angled portion comprises a cut and no ties.

22. The label assembly of claim 20, wherein the first label column has a first label column first side disposed toward and separated by a portion of the matrix from one side of the peripheral edge of the face sheet and a first label column second side disposed opposite the first side and disposed toward the second label column, and further comprising:
a second separation line dividing the label assembly into a third portion, the second separation line formed by a second separation line first line of weakening extending across the back sheet and a second separation line second line of weakening extending across the face sheet, the second separation line first line of weakening cut within the back sheet below the first label column first side, and offset from the second separation line second line of weakening;
one of the second separation line first or second line of weakening including a further parallel portion extending parallel to a side edge of the outer periphery of the face sheet, the one of the second separation line first or second line of weakening including a further angled portion extending at a non-perpendicular angle from the further parallel portion of the one of the second separation line first or second line of weakening toward an other of the one of the second separation line first or second line of weakening, wherein the further angled portion does not contact the other of the one of the second separation line first or second line of weakening.

23. The label assembly of claim 20, wherein the angled portion is angled from the parallel portion in a direction toward the first label column.

* * * * *

(12) EX PARTE REEXAMINATION CERTIFICATE (10825th)
United States Patent
Flynn (10) Number: US 8,273,436 C1
(45) Certificate Issued: Mar. 2, 2016

(54) SEPARATABLE LABEL ASSEMBLY

(75) Inventor: Timothy J. Flynn, Key Largo, FL (US)

(73) Assignee: FIRSTMERIT BANK, N.A., Akron, OH (US)

Reexamination Request:
No. 90/020,033, Sep. 25, 2012

Reexamination Certificate for:
Patent No.: 8,273,436
Issued: Sep. 25, 2012
Appl. No.: 11/901,414
Filed: Sep. 17, 2007

(51) Int. Cl.
*B32B 9/00* (2006.01)
*G09G 3/10* (2006.01)
*B32B 33/00* (2006.01)
*B32B 7/12* (2006.01)
*G09F 3/10* (2006.01)

(52) U.S. Cl.
CPC ..... *B32B 7/12* (2013.01); *G09F 3/10* (2013.01); *B32B 2307/75* (2013.01); *Y10T 428/14* (2015.01); *Y10T 428/149* (2015.01); *Y10T 428/1476* (2015.01); *Y10T 428/1495* (2015.01); *Y10T 428/15* (2015.01); *Y10T 428/24314* (2015.01); *Y10T 428/24777* (2015.01)

(58) Field of Classification Search
CPC ..... B32B 7/12; B32B 2307/75; Y10T 428/15; Y10T 428/24777; Y10T 428/1495; Y10T 428/24314; Y10T 428/1476; Y10T 428/14; Y10T 428/149; G09F 3/10
USPC ............... 428/42.2, 136, 192, 40.1, 41.8, 43; 40/638
See application file for complete search history.

(56) References Cited

To view the complete listing of prior art documents cited during the proceeding for Reexamination Control Number 90/020,033, please refer to the USPTO's public Patent Application Information Retrieval (PAIR) system under the Display References tab.

*Primary Examiner* — Elizabeth McKane (57) ABSTRACT

A label assembly including a face sheet, a back sheet, and a layer of an adhesive positioned between the face sheet and the back sheet. A separation line divides the label assembly into at least two portions. The separation line is formed by a first tearable line of separation extending across the back sheet and a second tearable line of separation extending across the face sheet. The first tearable line of separation is offset with respect to the second tearable line of separation, and at least one of the first and second tearable lines of separation includes an angled portion extending at an angle to an other of the at least one of the first and second tearable lines of separation.

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-23 are cancelled.

* * * * *